June 17, 1952  L. B. FEIERABEND  2,600,629
FISHING ROD JOINT
Filed June 11, 1949  2 SHEETS—SHEET 1
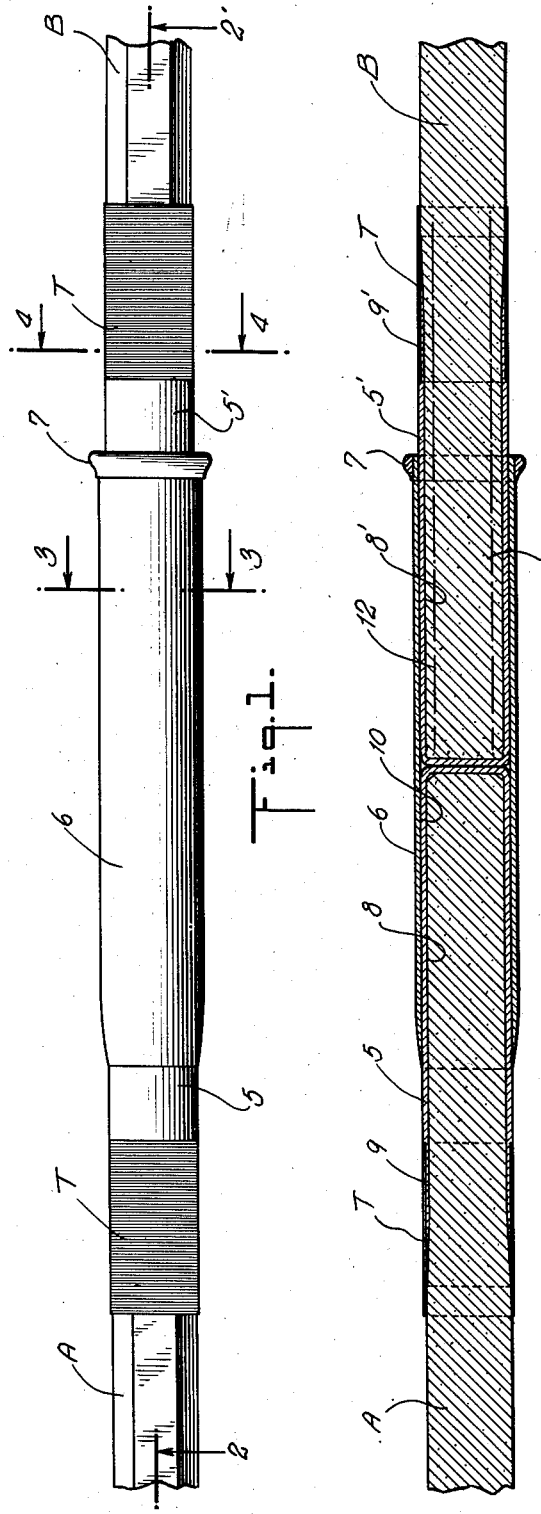
INVENTOR.
Louis B. Feierabend
BY Edward G. Roe
Attorney June 17, 1952 L. B. FEIERABEND 2,600,629
FISHING ROD JOINT
Filed June 11, 1949 2 SHEETS—SHEET 2
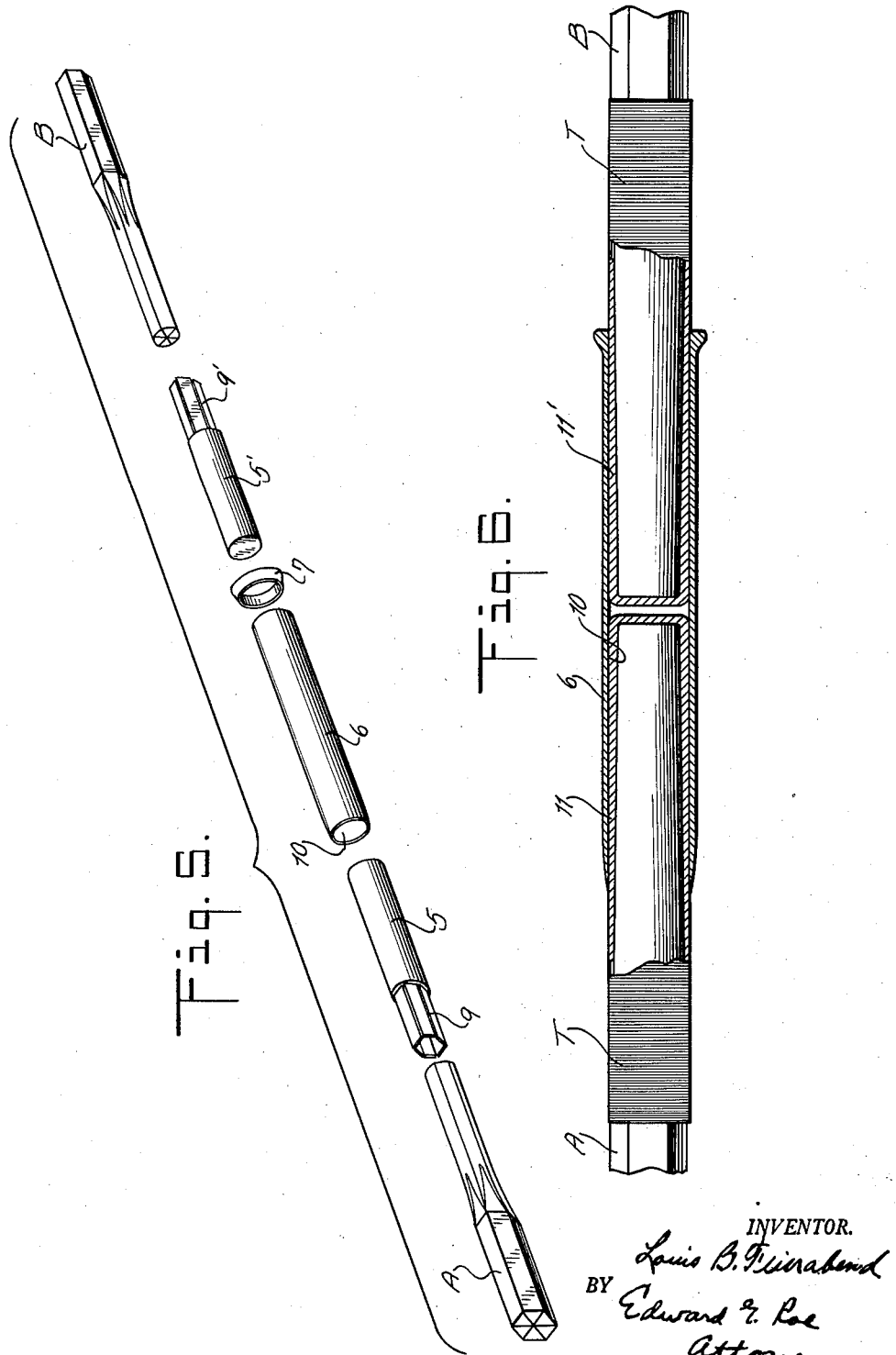
INVENTOR.
Louis B. Feierabend
BY Edward F. Roe
Attorney Patented June 17, 1952

2,600,629

UNITED STATES PATENT OFFICE 2,600,629

FISHING ROD JOINT

Louis B. Feierabend, Pearl River, N. Y., assignor to Super Z Manufacturing Co., Pearl River, N. Y., a partnership Application June 11, 1949, Serial No. 98,451

2 Claims. (Cl. 287—126)

In a generic sense, the invention relates to fishing rod joints.

It is known that the ideal fishing rod consists of one continuous properly tapered shaft of wood or other resilient material. However, practical considerations, such as transportation, storage, ease of handling, have necessitated compromises to reduce the vulnerability to damage. The usual procedure is to include one or more joints in the rod, permitting the rod to be dismantled and stored in a small space, such joints being fitted with metal telescoping members styled ferrules. Such ferrules have assumed various designs, for example, tapers, screw threads, plain cylindrical sleeves, and other constructions.

Introducing a ferrule creates a weakness in the rod, and that this weakness is inherent is evidenced by the fact that rods intended for heavy duty are built from an unjointed shaft.

Ferruled fishing rods are most frequently broken at the following three points:

(1) *The point of entry of wood into the metal*

There is high concentration of stress within the wood fiber at its entry point into the metal tube. Thinning and slotting the end of the ferrule introduces a degree of flexibility tending to spread the wood fiber stresses over a greater length. It follows that, within practical limits, longer slots are more beneficial than short ones. Compromises, however, are usually made in favor of shorter overall ferrule length which decreases "dead weight" and local stiffening.

(2) *The shoulder of the male telescoping member*

In most ferrules the male member consists of (a) a single step-drawn shell or (b) a closed end, two diameter unit appropriately machined and drilled from solid bar stock or (c) two telescoping tubes soldered together.

The greatest attribute of bamboo as a rod building material lies in the radial disposition of its grain structure. The outer layers are of an extremely hard, dense and compact structure. Inner stratae exhibit a diminishing density, becoming finally quite open, pithy and have insignificant tensile strength. It is desirable, therefore, that a minimum of the superior outer fiber be removed when joining the wood to the metal ferrule. If the stick is to be fitted into an ordinary two diameter ferrule, it is, of course, necessary to turn two appropriate wood diameters. The amount of dense outer fiber removed from the smaller diameter renders that length virtually worthless as a structural member. The loads are, therefore, assumed by the larger diameter which in most ferrules is far too short for a good mechanical joint. Frequent ferrule failures occur at this shoulder where the diameter becomes smaller. This larger diameter cannot reasonably be made longer as it imposes a greater stiff spot in the middle of the rod.

(3) *Tensile rupture of the outer (female) telescoping member at or near its midpoint*

Buckling and tensile rupture are brought about by insufficient ferrule wall thickness, material of short fatigue life or materials which are too soft for the purpose.

A thin walled ferrule is an asset from the standpoint of weight, but the diameter must be such to be commensurate with the strength of the stick. A material of long fatigue life is necessary as countless casts are made in the course of only a few seasons of fishing. Straining of the rod by the angler will produce bent ferrules, particularly if they are not of proper temper.

The above limitations have been confined to conditions of actual use. Additionally, current manufacturing processes frequently impose mechanical drawbacks. One fabricating procedure involves deep drawing of shell blanks from flat stock. The punch mandrels are usually slightly tapered to facilitate "stripping off" the formed shell. A varying wall thickness results with the closed end being thickest. However, the tapered wall is not detrimental to reliable performance. It is when the second diameter is drawn that the deficiency is introduced in the male ferrule: the thinnest wall exists at the base of the shoulder, the region that should be the strongest.

Male ferrules of two piece telescoped (soldered) construction were originated to strengthen the weak area. A "center" tube of somewhat heavier wall is almost universally employed, yet the abrupt change of section at the juncture of the two tubes still exists and remains a source of frequent failure.

It is essential in mounting the usual type of ferrule on the rod sticks that one diameter be turned to accommodate the female while two diameters must be produced for the male. This requires two tooling setups.

Small diameter sticks when turned to fit into the male "center" are quite flexible due to their overhand resulting in "hit or miss" accuracy. Hollow milling cutters solve the problem by eliminating the work springing away from the tool, but are relatively expensive to buy and maintain.

I have eliminated or minimized to a great extent the weaknesses inherent in previous ferrule constructions, and the mechanical drawbacks or disadvantages experienced in former manufacturing processes by devising a ferrule, which has for its objects and achieves the following:

1. *Shorter overall length.*—The overall length has been greatly shortened but maintains adequate wood-metal engagement. This tends to alleviate the flat, stiff spot in a rod. An interesting example shows that size $13/64$ ferrule is $1\frac{1}{4}''$ shorter than its conventional counterpart.

2. *Improved and greater rod shaft engagement into the ferrule.*—The entire ferrule length is utilized, with the exception of the closed ends of the inner members, thereby maintaining maximum strength at the joint.

3. *Identical ferrule diameters.*—Actual ferrule mounting is simplified as both the male and female sections require identical rod shaft diameters. This allows for a smooth continuous flow of natural rod taper throughout the entire length of the rod.

4. *Straight ferrule bore for both the male and female sections.*—For the entire length of engagement of the rod shaft into the ferrule it is necessary to remove only the corners of the bamboo stick to effect mounting, thereby retaining the maximum number of outer wood fibers, the strongest part of bamboo.

5. *Improved metal to metal ferrule fit.*—This is obtained by removing a few thousandths of an inch from the male diameter thus eliminating a critical shoulder where breaks often occur. A straight, round telescoping joint is produced, which results in a total working tolerance of plus or minus $1/10,000''$.

6. *The basic ferrule proportions.*—The basic ferrule proportions increases with each ferrule size. The center length, sleeve length and total overall length of each ferrule is proportional to the bore of each ferrule size. This design criteria is based on the actual stress analysis of the ferrule, since, from the bore diameter the moment of inertia is obtained which is directly connected with the bending and fatigue stress imposed on the ferrule.

Briefly described, the improved fishing rod joint comprises a ferrule having two identically dimensioned tubular portions, the latter closed at one end, an outer sleeve and reinforcing collar therefor, with one of the said portions fixedly positioned partially within and secured to the outer sleeve to form the female assembly of the ferrule, with the other inner tubular portion forming the male ferrule. The outer sleeve is provided with a straight, continuous bore therethrough, as have each of the inner portions. The female assembly: the sleeve and fixed inner tubular portion, are usually positioned on the butt side of the fishing rod sticks to be joined, with the male ferrule usually on the tip side, and the fishing rod sticks joined have identical diameters turned on the ends to be joined.

The construction of the fishing rod joint is susceptible of modification, and I have illustrated one such modification.

In the drawings:

Fig. 1 is a side elevation of one example of my invention, with one of the inner tubular portions fixedly positioned within the outer sleeve and the male ferrule assembled into the female assembly.

Fig. 2 is a longitudinal section taken along lines 2—2 of Fig. 1.

Fig. 3 is a vertical section on line 3—3 of Fig. 1.

Fig. 4 is a vertical section on line 4—4 of Fig. 1.

Fig. 5 an exploded view showing the components of the joint in extended position.

Fig. 6 is a longitudinal section of a modification of the joint.

By way of introduction, it should be understood that in the disclosure herein, the fishing rod sticks to be joined are described as made of bamboo. This is illustrative only, and is not to be construed as a limitation of the use of my ferrule. Fishing rods of any resilient material may be jointed, for example, those made of the material known as "Fiberglass," or of suitable woods other than bamboo, or any man-made materials having the desired structural characteristics. Additionally, the cross-section of the sticks are shown to be hexagonal, and it should be understood also that this is illustrative, and not limitative—as shapes other than hexagonal may be employed.

With reference to the drawings, a fishing rod joint embodying my invention in the embodiment shown, consists of two inner tubular portions 5, 5', an outer sleeve 6 and a reinforcement for one end of the latter which may take the form of a ring or collar 7.

The two inner tubular portions 5, 5' are tube-like in conformation, are identically dimensioned, centrally and straight bored, as at 8, 8', closed at one end, open at the other, and may be provided with conventional longitudinal serrations 9, 9', at spaced intervals at the open end. Being identically dimensioned, and straight bored, the inside diameters are the same throughout, as are the outside diameters.

Outer sleeve 6 is tube-like, having a straight center bore 10 open at both ends, and the inside diameter of said sleeve corresponds precisionwise with the outside diameter of portions 5, 5' so that when the closed ends of the latter are inserted therein, a precision-fit results.

Portion 5 is positioned and fixedly secured partially within sleeve 6 as best shown in Fig. 2 by soldering for example, so that its closed end is approximately midway of the said sleeve and to accommodate the solder, as a manufacturing expedient, the fitted surface 5 may be turned down slightly. The open end of said inner portion extends outwardly from the said sleeve.

For reinforcing the opposite end of sleeve 6, collar 7 may be mounted thereon, by soldering or otherwise, and such reinforcement is designed to and does prevent "bell mouth" deformation as, in practice, the male portion 5' is inserted and removed from the outer sleeve.

The female assembly which may be styled the female ferrule assembly of my fishing rod joint, then, comprises inner tubular portion 5, outer sleeve 6, reinforcing ring 7, marshalled into one exceptionally strong assembly.

With portions 5, 5' having identical straight bores, in joining sticks A and B it is necessary only to turn identical diameters on the ends thereof, joined as in Fig. 2, instead of having to produce at least two or three diameters as in fitting most conventional fishing rod ferrules. And what is also of capital importance, in my construction the bore of each of members 5, 5' is uniform throughout and corresponds to the inscribed diameter of the polygonal cross-section of the bamboo stick. As a result thereof only the corners of the bamboo need be removed, and the long embracement of the strong outer bamboo wood fibre to the metal ferrule affords a relatively large surface area available for bonding which obviates pinning and provides great combined strength of wood and metal. This results because with my construction, the maximum number of outer wood fibres of the segmented bamboo are retained, and these, as hereinbefore stated, are of maximum strength. The circumferential winding of conventional binding thread T around the serrated portions of members 5, 5', secures said serrated portions to sticks A and B within said members.

Reversing the usual procedure, wherein, as hereinbefore stated, the telescoping diameter of my ferrule is increased to fit over the inner portions 5, 5', further enabling the construction to resist the heavy loads occurring at the unsupported midpoint. The joint is, in effect, tapered, the cross section increasing to meet the rising stress and diminishing as the wood fibre re-assumes the burden.

The female assembly, consisting of the inner tubular portion 5, outer sleeve 6 and reinforcing ring 7, with the fishing rod stick seated home, and conventional binding thread T applied, as depicted in Figs. 1 and 2—is on the butt side of the fishing rod joint, with the male ferrule, or cylindrical portion 5', with stick B seated home, and binding thread T wrapped on the top side.

In fabricating my fishing rod joint, I may employ waterproof plugs to close the inner ends of tubular portions 5, 5', instead of employing stock having closed ends as illustrated in the drawings. Additionally, I propose that the modification shown in Fig. 6 may be made wherein inner tubular portions 11, 11' are tapered small to bottom, or the male ferrule member 11' may be provided with less inside diameter than the inside diameter of the member 11, since this male member is on the tip side of the rod, and it may be desirable to have the said member of less diameter than the female ferrule on the butt side. Further the male ferrule member 5' of Fig. 2 may be furnished with a smaller inside diameter than the inside diameter of the companion ferrule member 5, as indicated by dot and dash lines 12 in Fig. 2.

I also propose, as a modification, not shown, that the outer shell 6 and the fixed inner portion 5 may be provided in one piece, by either manufacturing from solid bar stock, or other manufacturing process. And too, without departing from the inventive concept, reinforcing collar or ring 7 may be eliminated, if reinforcement is formed on the periphery of the end of sleeve 6 during fabrication.

As to materials I may use metal alloys of the desired tensile strength and finish. An example is an alloy consisting of 18% nickel, zinc 10-15% and the remainder copper, but this is illustrative only. Other suitable materials may be employed.

In the invention, as hereinbefore stated, the center length, sleeve length, and total overall length of each ferrule is proportional to the bore of each ferrule size, the design criteria being based on the actual stress analysis of the ferrule, since, from the bore diameter, the moment of inertia is obtained which is directly connected with the bending and fatigue stress imposed on the ferrule.

A fishing rod joint constructed in accordance with my invention marshalls exceptional strength, resistance to stress, strain, or tendency to buckle, and fatigue, in the joint. In recapitulation, shorter overall length is a result, yet maintaining adequate rod-metal engagement, alleviating the flat, stiff spot in a rod. Improved rod shaft engagement into the ferrule, identical ferrule diameters, and straight ferrule bore for both the male and female sections, is achieved, as well as a precision metal to metal fit. Basic ferrule proportions have been established, wherein, the center length, sleeve length, and total overall length of each joint are proportional to the bore of each ferrule size.

As to the terms employed herein, the words "ferrule," "portion," "member" are at times used for the same part, but such use is not to be construed as limiting, but are to be construed in their broadest sense.

I reserve to make such changes and modifications as may come within the scope of the appended claims.

I claim:

1. In a joint for fishing rod sections having uniform diameters, an open ended outer sleeve having a continuous internal opening of uniform diameter from end to end, a pair of ferrules in said sleeve for said rod sections, said ferrules having uniform external diameters from end to end thereof equal to the internal diameter of said sleeve opening, each of said ferrules being of a length greater than at least half the length of said sleeve, whereby the combined length of said ferrules is greater than the total length of said sleeve and whereby said ferrules may have their outer ends protruding from said sleeve when their inner ends are in engagement therein, said inner ends of said ferrules being closed, and each of said ferrules having a uniform internal diameter from end to end one of said ferrules being fixed permanently to and within said sleeve and the other of said ferrules being slidable therein.

2. A joint as set forth in claim 1, wherein said ferrules have internal diameters equal to the maximum diameters of the rod sections at the ends to be joined, including rod sections fitting into respective ferrules and extending to the closed ends thereof.

LOUIS B. FEIERABEND.

REFERENCES CITED

The following references are of record in the file of this patent:

UNITED STATES PATENTS

| Number | Name | Date |
| --- | --- | --- |
| 169,181 | Leonard | Oct. 26, 1875 |
| 427,162 | Edwards | May 6, 1890 |
| 428,755 | Hawes | May 27, 1890 |
| 537,088 | Varney | Apr. 9, 1895 |
| 703,721 | Faber | July 1, 1902 |
| 1,463,084 | Hudson | July 24, 1923 |